United States Patent [19]

Zaugg

[11] 4,033,114

[45] July 5, 1977

[54] METHOD FOR STARTING A GAS TURBINE PLANT WITH AN AIR ACCUMULATOR

[75] Inventor: Paul Zaugg, Baden, Switzerland

[73] Assignee: BBC Brown Boveri & Company Limited, Baden, Switzerland

[22] Filed: Nov. 26, 1975

[21] Appl. No.: 635,350

[30] Foreign Application Priority Data

Aug. 30, 1975 Germany ............................ 2538756

[52] U.S. Cl. ................................ 60/39.02; 60/39.14
[51] Int. Cl.² ........................................ F02C 7/26
[58] Field of Search ............ 60/39.02, 39.03, 39.04, 60/39.14

[56] References Cited

UNITED STATES PATENTS

| | | | |
|---|---|---|---|
| 2,443,841 | 6/1948 | Sweeney et al. ................... | 60/39.04 |
| 3,631,673 | 1/1972 | Charrier et al. ................... | 60/39.02 |

Primary Examiner—Carlton R. Croyle
Assistant Examiner—L. J. Casaregola
Attorney, Agent, or Firm—Pierce, Scheffler & Parker

[57] ABSTRACT

A method for starting up a gas turbine system by means of compressed air delivered from an air-storage chamber and wherein the turbine system is comprised of high and low pressure turbines operating on a common shaft, there being high and low pressure combustion chambers respectively preceding the high and low pressure turbines, and an electrical generator connectible to the turbine shaft through coupling means which serves as the load for the turbine system. The method involves feeding compressed air from the storage chamber through the turbines to accelerate them to normal operating speed, igniting the high-pressure combustion chamber during acceleration of the turbines but with a low fuel input, then coupling the generator to the turbine shaft, then igniting the low-pressure combustion chamber, then increasing the pressure at the high-pressure combustion chamber to the full operating pressure to increase the air flow to an amount greater than that normally maintained during the operating period of the turbine system, then increasing the admission temperature of the air to the low-pressure turbine until the full output of the turbine has been reached, and simultaneously increasing the admission temperature of the air to the high-pressure turbine until its full operating temperature has been reached.

2 Claims, 1 Drawing Figure

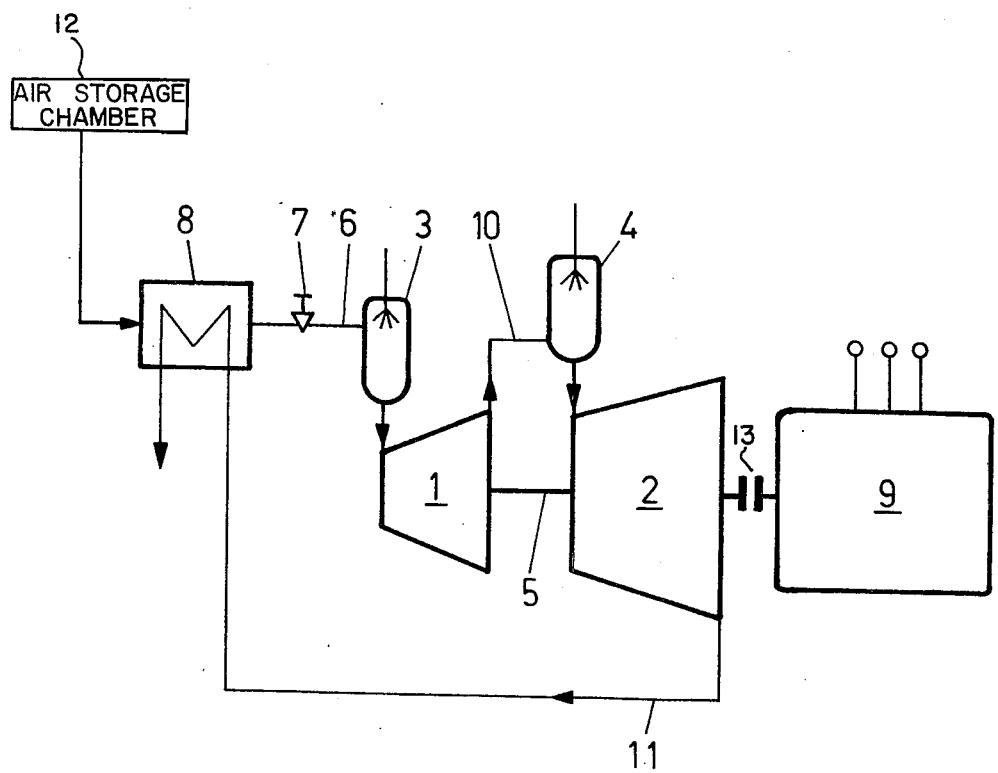

METHOD FOR STARTING A GAS TURBINE PLANT WITH AN AIR ACCUMULATOR

The present invention concerns a method for starting-up a gas turbine system having an air-storage chamber, as well as a gas turbine for the practical application of said method, where a high-pressure turbine, preceded by a high-pressure combustion chamber, and a low-pressure turbine, preceded by a low-pressure combustion chamber, are arranged at one common shaft, and where the air for combustion is delivered from the air-storage chamber to a high-pressure combustion chamber.

The use of power plants equipped with air-storage chambers makes it possible to convert energy, stored during light-load periods in the form of compressed air, into mechanical or electrical energy by way of a gas turbine during periods of peak demands. In the case of gas turbine systems with air-storage chambers the compression and the expansion of the energy medium, i.e. air, are separated in time. This separation results in the advantage that the entire turbine output of the gas turbine will be available as effective power, while in the case of a conventional gas turbine only approximately ⅓ of the turbine output will be effective because the air compressor requires approximately ⅔ of the turbine output for its drive. In the case of a turbine system with air-storage chamber, the air compressor is driven by extraneous energy, preferably by a motor which draws its energy from the electric power mains. In order to accomplish the separation in time of the compression and expansion process there is needed an air chamber to store the compressed air.

The compressor, operated for example during the night by electric energy drawn from the power mains, draws in ambient air and pumps it into the chamber. At a time of peak demand the compressed air is drawn from the chamber, heated in a combustion chamber by the combustion of fuel, and is expanded in the turbine down to atmospheric pressure. A generator, driven by the turbine, re-converts the mechanical energy so produced into electrical energy.

Various solutions concerning gas turbine systems with air-storage chambers are known, for example the arrangement of a gas turbine with combustion chamber, corresponding to the turbine section of a standard industrial gas turbine, which means that the turbine admission pressure amounts to approximately 10 bar.

This arrangement has the disadvantage that substantial throttling losses will occur if the storage chamber pressure is significantly greater than the turbine admission pressure, losses which must be covered by a corresponding increase in charging energy when filling the storage chamber. If, on the other hand, the storage chamber pressure is only non-essentially higher than the turbine admission pressure, it becomes necessary to increase the storage chamber dimensions, thus making such storage chamber costly and uneconomical.

Another known gas turbine system with air-storage chamber also uses a gas turbine with a combustion chamber which corresponds to the turbine section of a standard industrial gas turbine, but the turbine section is preceded by a high-pressure turbine which is located on the same shaft. The air supplied by the storage chamber is pre-heated by the exhaust gases of the low-pressure turbine by means of a preheater and then fed into the high-pressure turbine.

However, this arrangement is disadvantageous due to the fact that the admission temperature of the high-pressure turbine is very low, with the result that the increase in output generated by the additional turbine, is not sufficiently significant to justify the complicated system. Furthermore, the admission temperature at the high-pressure turbine is a constant function of the outlet temperature at the low-pressure turbine, thus limiting the possibilities to regulate the machine system.

It is the principal object of the invention to provide a gas turbine system with an air-storage chamber where only low turbine admission temperatures are required for the starting-up operation, and where, after rapid acceleration a full mechanical output becomes practically immediately available.

The invention solves this problem by the following process steps:

a. The gas turbine is loaded with air from the storage chamber until the operating speed has been reached, b. during the acceleration of the gas turbine the high-pressure combustion chamber is ignited, with the admission temperature at the high-pressure section of the gas turbine being maintained at a minimum value, c. when the gas turbine is placed under load, the low-pressure combustion chamber is ignited, and the pressure at the high-pressure combustion chamber is increased up to full operating pressure, whereby the quantity of air, flowing through the high- and low-pressure turbine, will be greater than during continuous operation, d. the admission temperature at the low-pressure section of the gas turbine is increased somewhat until the full output of the gas turbine is reached, e. the admission temperature at the high-pressure section of the gas turbine is raised linearly from the minimum value up to full operating temperature, f. simultaneously with the rise of the admission temperature at the high-pressure section of the gas turbine, the admission temperature at the low-pressure section of the gas turbine is increased thusly that the output of the gas turbine will remain constant, and that the rate of air flow is decreased to the normal value.

A gas turbine designed for the practical application of the above described method is characterized thusly that the pressure ratio between admission and outlet pressures of the low-pressure section of the gas turbine is at least 2.5 times greater than the pressure ratio between admission and outlet pressures of the high-pressure section of the gas turbine.

A method for starting-up a gas turbine system with air-storage chamber, as proposed by the invention, offers the particular advantage that it will now be possible after a rapid acceleration of the rotor to operating speed, to attain full output even at very low temperature values, especially so far as the admission temperature at the high-pressure section of the gas turbine is concerned, with the result that the system can be placed under full load almost immediately at the time of starting-up, with the increase in temperature being accomplished gradually thereafter. Thus, thermal stresses, especially within the blading of the high-pressure turbine, will be kept to a minimum. There will be a need for a greater volume of air, but comparative tests show that in the case of an extension of the starting-up operation up to one fourth of the total turbine operating period, for example 30 minutes of starting-up time for two hours of operating time, and a gradual increase in the admission temperature from 250° C to 550° C at the high-pressure section and from 675° C to 825° C at the low-pressure section, the additional air consumption will amount to only 3.5 to 4% in comparison with the method where top temperatures are used at all times.

The accompanying drawing illustrates schematically a gas turbine system for the practical application of the novel method.

In the drawing a high-pressure turbine 1 is followed by a low-pressure turbine 2. In advance of the high-pressure turbine 1 there is arranged a high-pressure combustion chamber 3, and in advance of the low-pressure turbine 2 at the outlet of turbine 1 there is arranged a low-pressure combustion chamber 4. The high-pressure turbine 1 and the low-pressure turbine 2 are located on the same shaft 5. The high-pressure combustion chamber 3 is connected with an air-storage chamber 12 by way of a connecting pipe 6, the pipe being provided with a control valve 7. In order to reduce fuel consumption, the air supplied by the storage chamber can be pre-heated prior to its entry into the high-pressure combustion chamber 3 by an air pre-heater 8. At the driving side of shaft 5, following the low-pressure turbine 2 there is coupled to the gas turbine system a driven power unit, preferably an electric generator 9. A connection 10 leads from the outlet of the high-pressure turbine 1 to the low-pressure combustion chamber 4, and an outlet pipe 11 from the low-pressure turbine 2 to the air pre-heater 8.

The gas turbine system with air-storage chamber operates as follows:

Air is conducted from the storage chamber through the control valve 7 into the high-pressure turbine 1, charging the rotor blades until the high-pressure turbine 1 reaches its operating speed. The high-pressure combustion chamber 3 is ignited at the same time, but the inflow of fuel is regulated in such manner that the admission temperature at the high-pressure turbine 1 will be kept as low as possible, i.e. only such amount of fuel is being used which will prevent an extinguishing in the combustion chamber. Since the high-pressure turbine 1 and the low-pressure turbine 2 are arranged on a common shaft 5, the low-pressure turbine 2 will reach its operating speed at the same time also. A driven power unit, for example a generator 9, is now connected by means of a coupling 13 at the driving side of shaft 5 after the low-pressure turbine 2, thus loading the gas turbine; the low-pressure combustion chamber 4 is now ignited also, and the high-pressure combustion chamber is now also brought up to the full operating pressure. The admission temperature at the low-pressure turbine 2 is increased now until the full output of the gas turbine has been reached. The admission temperature at the high-pressure turbine 1 is raised linearly from its initial minimum value until the full operating temperature has been reached, and at the same time the admission temperature at the low-pressure turbine 2 is increased in such manner that the output of the gas turbine will remain constant.

The above described regulating processes make it possible to shorten significantly the starting-up time of the gas turbine can be placed under full load practically immediately upon acceleration.

I claim:

1. In the method for starting-up a gas turbine system by means of compressed air delivered from an air-storage chamber, and wherein said turbine system is comprised of a high-pressure turbine and a low-pressure turbine operating on a common shaft, a high-pressure combustion chamber preceding said high-pressure turbine, a low-pressure combustion chamber preceding said low-pressure turbine in the air flow path, and a connection from said air-storage chamber to said high-pressure combustion chamber, and wherein a rotary load such as an electrical generator is connectible to said turbine shaft through coupling means, the improvement characterized by the following steps:
   a. feeding compressed air from said storage chamber through said turbine system to accelerate the same to normal operating speed,
   b. igniting said high-pressure combustion chamber during the acceleration of said turbine system and controlling fuel flow thereto such as to maintain the air admission temperature to said high-pressure turbine at a minimum value,
   c. coupling the rotary load to said turbine shaft,
   d. igniting said low-pressure combustion chamber,
   e. increasing the pressure at the high-pressure combustion chamber up to the full operating pressure thereby raising the quantity of air flow through said high- and low-pressure turbines to an amount greater than is normally maintained during the operating period of the turbine system,
   f. increasing the admission temperature of the air at said low-pressure turbine until the full output of the turbine has been reached, and
   g. increasing the admission temperature of the air at said high-pressure turbine linearly from said initially minimum value to the full operating temperature while simultaneously decreasing the flow rate of said air, the increasing increase in admission temperature of the air at said low-pressure turbine being made simultaneously with the increase in admission temperature of the air at said high-pressure turbine whereby the output of the turbine system will remain constant and the rate of air flow through the turbine system is reduced to its normal value.

2. A gas turbine system operated in accordance with the method as defined in claim 1 and wherein the pressure ratio between admission and outlet pressures of said low-pressure turbine is at least 2.5 times greater than the pressure ratio between admission and outlet pressures of said high-pressure turbine.

* * * * *